(12) United States Patent  
Hirono

(10) Patent No.: US 6,900,613 B2  
(45) Date of Patent: May 31, 2005

(54) MOTOR CONTROL APPARATUS

(75) Inventor: Daisuke Hirono, Isesaki (JP)

(73) Assignee: Sanden Corporation, Gunma (JP)

( * ) Notice: Subject to any disclaimer, the term of this patent is extended or adjusted under 35 U.S.C. 154(b) by 21 days.

(21) Appl. No.: 10/716,591

(22) Filed: Nov. 20, 2003

(65) Prior Publication Data

US 2004/0104704 A1 Jun. 3, 2004

(30) Foreign Application Priority Data

Dec. 3, 2002 (JP) .......................................... 2002-351501

(51) Int. Cl.[7] .............................................. H02P 5/00
(52) U.S. Cl. ....................... 318/722; 318/700; 318/714; 318/715; 318/718; 318/800; 318/801
(58) Field of Search ................................ 318/722, 700, 318/714, 715, 718, 800, 801

(56) References Cited

U.S. PATENT DOCUMENTS

| | | | | |
|---|---|---|---|---|
| 5,726,549 A | * | 3/1998 | Okuno et al. ................ | 318/721 |
| 5,903,128 A | * | 5/1999 | Sakakibara et al. .......... | 318/721 |
| 5,903,129 A | * | 5/1999 | Okuno et al. ................ | 318/721 |
| 6,281,656 B1 | * | 8/2001 | Masaki et al. ............... | 318/700 |
| 6,583,593 B2 | * | 6/2003 | Iijima et al. ................. | 318/254 |

FOREIGN PATENT DOCUMENTS

| | | |
|---|---|---|
| JP | 2000350489 | 12/2000 |
| JP | 2001251889 | 9/2001 |
| JP | 2001268974 | 9/2001 |

* cited by examiner

*Primary Examiner*—Rita Leykin  
(74) *Attorney, Agent, or Firm*—Baker Botts L.L.P.

(57) ABSTRACT

A motor control apparatus includes a phase current detecting section for detecting phase currents to a motor, a current phase/current peak value calculating section for calculating a current phase based on the phase currents, a voltage phase setting section for adding a predetermined phase difference to the current phase and setting the resultant sum as a voltage phase, a phase voltage setting section for setting phase voltages to the motor based on the voltage phase and the command voltage. Basically, the motor is operated by maintaining the voltage at constant and always monitoring the current/voltage phases so as to maintain a constant phase difference, without the motor axis position being predicted.

6 Claims, 4 Drawing Sheets

MOTOR CONTROL APPARATUS

BACKGROUND OF THE INVENTION

1. Technical Field

The present invention relates to a motor control apparatus for controlling a synchronous motor such as brushless motor and reluctance motor by using an electric power converter such as inverter, and more particularly, to a motor control apparatus for controlling the speed, etc. of a synchronous motor, without using a sensor for detecting the motor axis position.

2. Related Art

There are a rectangular drive system (120 degree excitation system) and a sinusoidal drive system (180 degree excitation system) that serve as a drive system for brushless motor that is well known as synchronous motor. The sinusoidal drive system supplies a sinusoidal phase current to a motor, to realize low vibration, low ambient noise, and high efficiency, and is superior in these respects to the rectangular drive system.

As a motor axis detecting system for brushless motor, there are one that utilizes a signal from a position detecting sensor such as rotary encoder and resolver, and one that acquires position information from the phase current and phase voltage of a motor, without using a position detecting sensor. The latter or sensorless system does not require the provision of a position detecting sensor and wiring therefor, to thereby achieve a reduction in cost, and is superior in this respect to the former sensor system with sensor.

Under these circumstances, attempts have recently been made to control a brushless motor by means of a sensorless sinusoidal drive system (see for instance, JP-A-2001-268974, JP-A-2001-251889, JP-A-2000-350489, "Sensorless salient type brushless DC motor control based on speed electromotive force estimation," Takeshita, Ichikawa, Li, Matsui in Nagoya Industry University, T. IEE Japan, Vol. 117-D, No. 1, 1997). An example of sensorless sinusoidal drive systems is shown in FIG. 1.

In FIG. 1, reference numeral 51 denotes a motor; 52, electric power converting section (inverter); 53, DC power supply; 54, PWM signal generating section; 55, phase voltage determining section; 56, applied current determining section; 57, rotational speed command; 58, current/voltage detecting section; 59, d/p-axis converting section; 60, axis position predicting section; 61, motor rotational speed calculating section; and 62, 63, adders.

The applied current determining section 56 determines an applied current based on the rotational speed command 57 and motor rotational speed, and the phase voltage determining section 55 determines a phase voltage based on a predicted axis position and current phase. The current/voltage detecting section 58 detects a phase current and phase voltage to the motor, the d/p-axis converting section 59 performs a d/p-axis conversion of the phase current and phase voltage from the current/voltage detecting section 58, based on current phase information from the axis position predicting section 60, and the axis position predicting section 60 predicts, by calculation, an axis position of the motor 51 based on d- and p-axis components Id, Ip, Vd, Vp of current and voltage and the motor rotational speed. The motor rotational speed calculating section 61 calculates an angular velocity ω on the basis of current phase information supplied from the axis position predicting section 60, etc.

The foregoing motor control apparatus controls the motor operation by means of a control loop for determining the phase voltage to the motor so as to maintain the phase current to the motor at constant, a control loop for predicting the motor axis position from the applied phase current and phase voltage, and a control loop (motor speed feedback loop) for calculating the motor rotational speed from the predicted motor axis position and for changing the constant phase current to the motor. This motor control apparatus entails a drawback that complicated calculations are required to control drive of the motor since the double feedback control for current is inevitably necessary, and a drawback that a control circuit which is high in processing speed and hence high-priced is required since both the current feedback control and the speed feedback control must be made at extremely high speeds. It entails a further drawback that, in addition to complicated calculations being required for the prediction of motor axis position, a sufficiently high position accuracy cannot be attained even by such complicated calculations being made.

SUMMARY OF THE INVENTION

An object of the present invention is to provide a motor control apparatus capable of stably operating a motor, without the need of complicated calculations for control of drive of the motor.

According to the present invention, there is provided a motor control apparatus for driving, by means of a power converter such as inverter, a synchronous motor such as brushless motor not provided with a sensor for detecting a motor axis position. This motor control apparatus comprises phase current detecting means for detecting phase currents to the synchronous motor, current phase calculating means for calculating a current phase based on the phase currents detected by the phase current detecting means, voltage phase setting means for setting a voltage phase that is determined by adding a predetermined phase difference to the current phase calculated by the current phase calculating means, command voltage determining means for determining a command voltage based on a rotational speed command, and phase voltage setting means for setting phase voltages to the synchronous motor based on the voltage phase set by the voltage phase setting means and the command voltage determined by the command voltage determining means.

According to the motor control apparatus of this invention, the current phase is determined based on the phase currents to the synchronous motor, and phase voltages to the synchronous motor are set on the basis of a voltage phase determined by adding a predetermined phase difference to the current phase and a command voltage determined based on a rotational speed command, whereby the synchronous motor can be operated, without predicting the motor axis position, basically by maintaining the voltage at constant and by always monitoring the current and voltage phases so as to maintain a constant phase difference.

The above object, other objects, structural features, and functions and advantages of this invention will be apparent from the following description and the appended drawings.

DETAILED DESCRIPTION

In the following, a motor control apparatus according to an embodiment of this invention will be explained.

Figure 1:
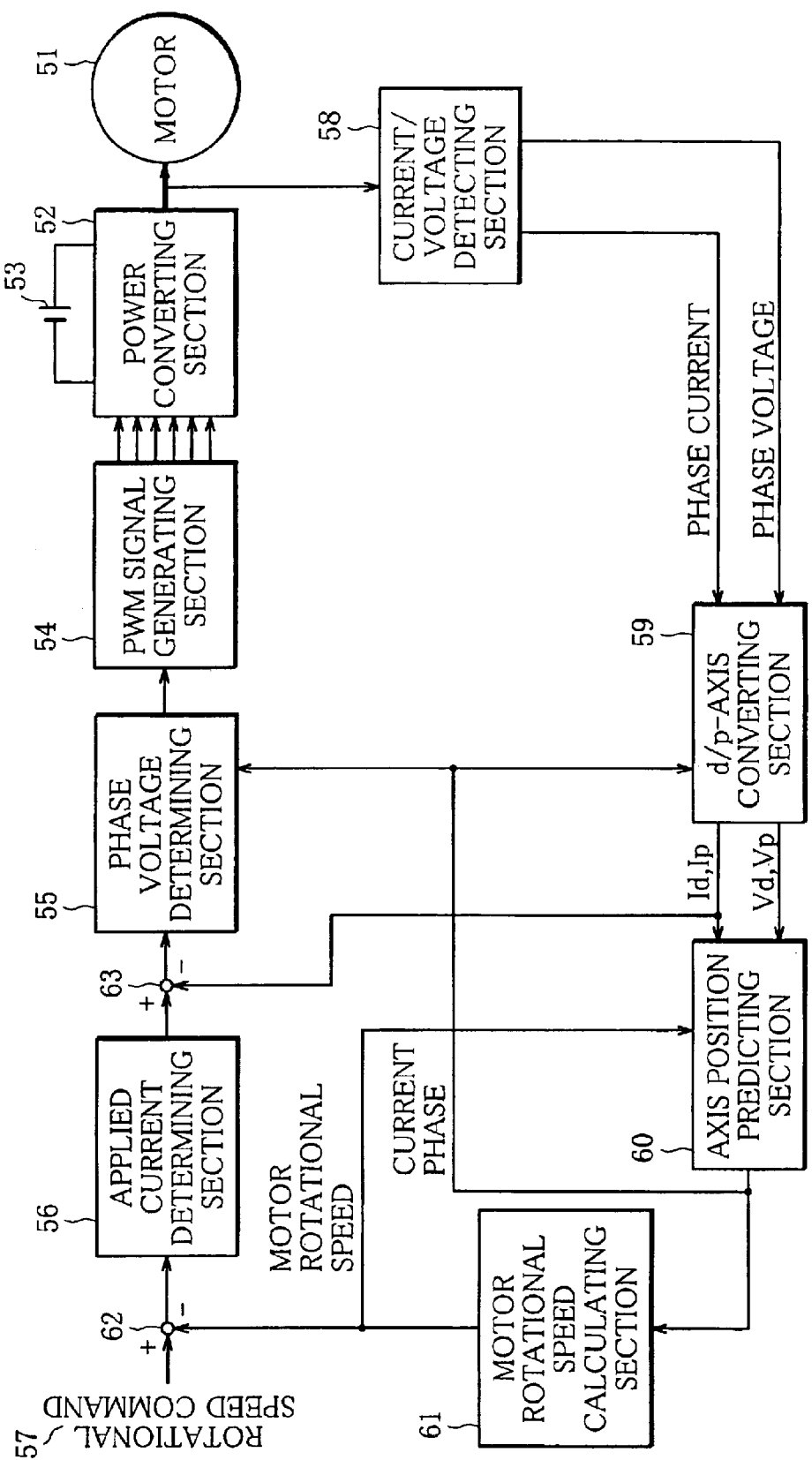
FIG. 1 is a block diagram showing a conventional motor control apparatus.
Figure 2:
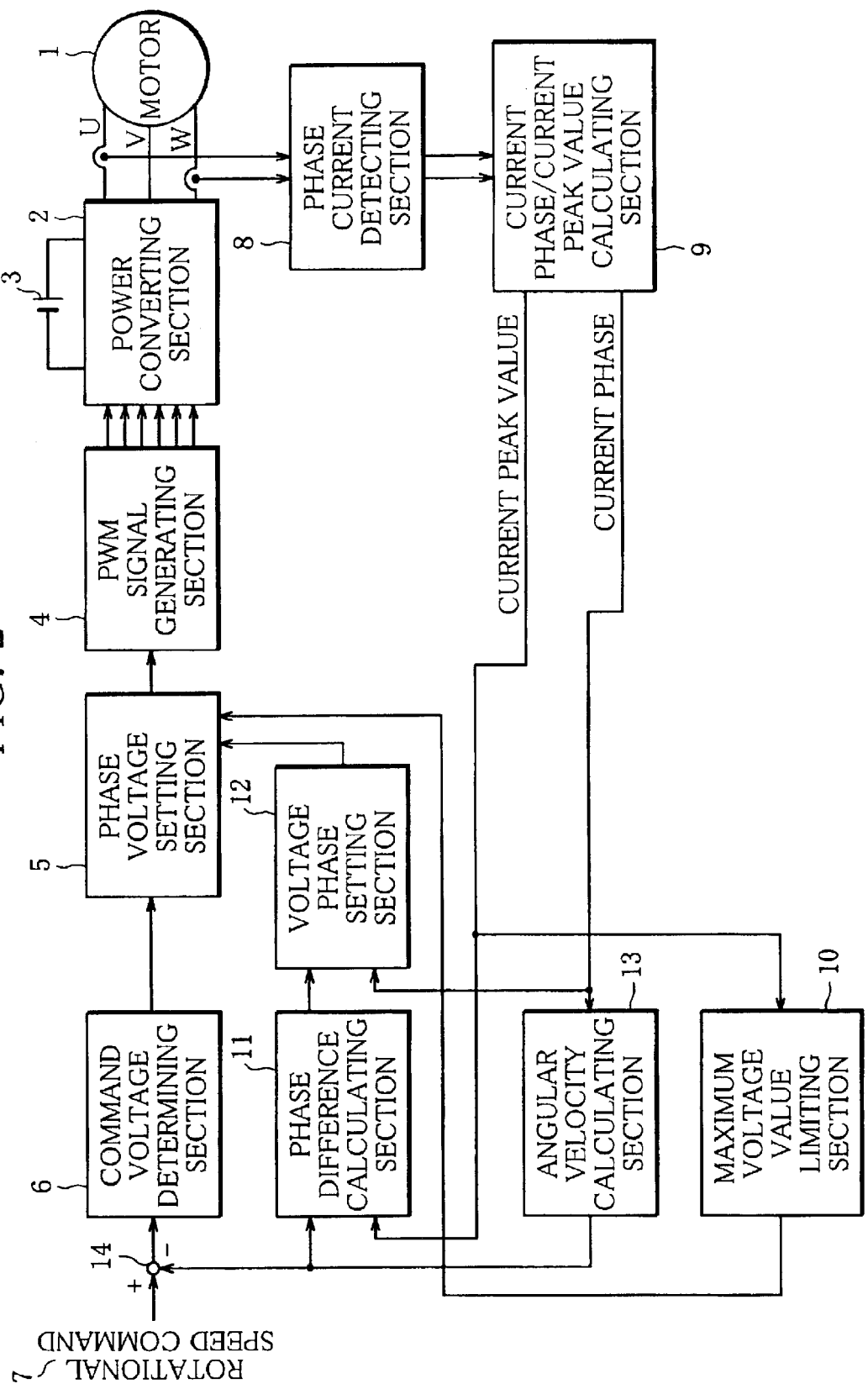
FIG. 2 is a block diagram showing a motor control apparatus according to an embodiment of this invention.

As shown in FIG. 2, the motor control apparatus for controlling a motor 1 comprises a power converting section 2, a DC power source 3, a PWM signal generating section 4, a phase voltage setting section 5, a command voltage determining section 6, a phase current detecting section 8, a current phase/current peak value calculating section 9, an angular velocity calculating section 10, a phase difference calculating section 11, a voltage phase setting section 12, a maximum voltage value limiting section 13, and an adder 14.

Figure 3:
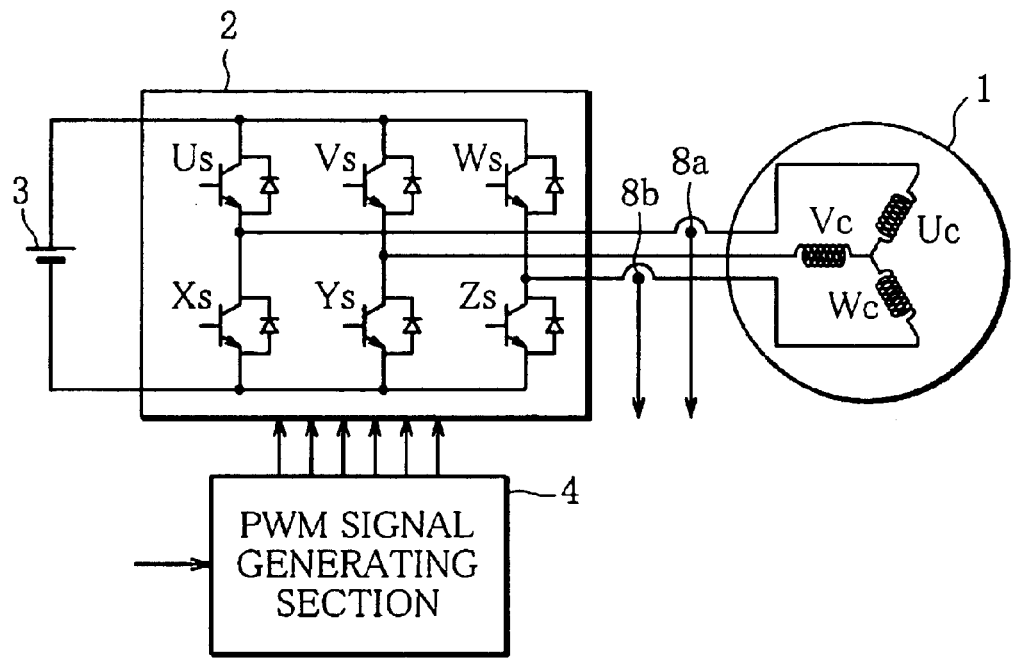
FIG. 3 is a view showing in detail a power converter shown in FIG. 2.

The motor 1 is a three-phase brushless DC motor, and is driven by U-, V-, and W-phase signals delivered from the power converting section 2. As shown in FIG. 3, the power converting section 2 comprises three pairs of switching transistors Us, Xs; Vs, Ys; and Ws, Zs individually corresponding to U-, V-, and W-phases and connected in parallel with one another. Each switching transistor pair Us, Xs; Vs, Ys; or Ws, Zs is connected in series with the DC power source 3 comprised of a battery or the like. These six switching transistors Us, Xs; Vs, Ys; and Ws, Zs are turned on and off by PWM signals supplied from the PWM signal generating section 4.

The PWM signal generating section 4 generates the PWM signals based on phase voltages that are set by the phase voltage setting section 5 and delivers the PWM signals to the power converting section 2. As for a method for determining the phase voltages in the phase voltage setting section 5 and a method for determining a command voltage in the command voltage determining section 6 provided on the upstream of the phase voltage setting section 5 will be described in detail later.

The phase current detecting section 8 detects two phase currents, e.g., U- and W-phase currents Iu and Iw among three phase currents Iu, Iv and Iw that are supplied to the motor 1. For the phase current detection, well known current sensors 8a, 8b (refer to FIG. 3) may be used, where appropriate, each of which is comprised of a coil, a Hall element, and the like.

The current phase/current peak value calculating section 9 calculates a motor current peak value I and a current phase δ based on the two phase currents detected by the phase current detecting section 8. In the following, a method for calculating the motor current peak value I and the current phase δ will be explained.

If the motor current peak value and the current phase are individually indicated by I and δ, the U-, V- and W-phase currents Iu, Iv and Iw can be represented as follows: Iu=I×cos(δ), Iv=I×cos {δ−(⅔)π}, and Iw=I×cos {δ+(⅔)π}. Therefore, the motor current peak value I and the current phase δ can be determined when two of three phase currents are known.

For instance, when the U- and V-phase currents Iu, Iv are detected, the motor current peak value I and the current phase δ can be determined in accordance with the relationship of Iv=−Iu−Iw and the following formulae (derived from the foregoing formulae): I=√{(⅔)×{Iu²+Iv²+Iw²}, cos(δ)=Iu/I, and sin(δ)=(Iv−Iw)/(√3×I).

On the other hand, when the U- and W-phase currents Iu, Iw are detected, the motor current peak value I and the current phase δ can be determined in accordance with formulae of: {I²×sin²(δ)}+{I²×cos²(δ)}=Iu²+{(1/√3)²×(2×Iw+Iu)²}, I²=Iu²+{(⅓)×(2×Iw+Iu)²}, I=√[Iu²+{(⅓)×(2×Iw+Iu)²}], cos(δ)=Iu/I, and sin(δ)={(1/√3)×(2×Iw+Iu)}/I, which are based on the following formulae: Iw={(−½)×I×cos(δ)}−{√(3/2)×I×sin(δ)} and I×sin(δ)=(−1/√3)×(2×Iw+Iu).

Meanwhile, the current phase δ determined in the above manner can be affected by harmonic components, resulting in waveform turbulence. It is therefore desirable to perform waveform shaping by means of known filtering with a LPF (low pass filter) to remove the harmonic components. Of course, such filtering may be made by digital calculations utilizing an FIR filter, an IIR filter, or the like.

The angular velocity calculating section 10 calculates the angular velocity ω of induced voltage ωΨ (refer to FIG. 4) based on the current phase δ determined by the current phase/current peak value calculating section 9. More specifically, the angular velocity ω is calculated in accordance with the following formula: ω(rad/sec)={δ(t)−δ(t−1)}/Δt, where Δt(sec) indicates a cycle of fetching the current phase δ; δ(t−1), a current phase fetched at a time of (t−Δt); and δ(t), a current phase fetched at a time of t.

Meanwhile, the angular velocity ω determined in the above manner can greatly vary on each cycle if Δt is short, and thus it is desirable to perform processing to reduce variations by means of known filtering using a LPF (low pass filter) or a PI control in determining the angular velocity ω. Of course, such filtering may be made by digital calculations utilizing an FIR filter, an IIR filter, or the like.

The phase difference calculating section 11 calculates a phase difference α based on the motor current peak value I determined by the current phase/current peak value calculating section 9, the angular velocity ω determined by the angular velocity calculating section 10, and a target current phase lead angle β. In the following, a method of calculating the phase difference α will be explained with reference to FIG. 4.

Figure 4:
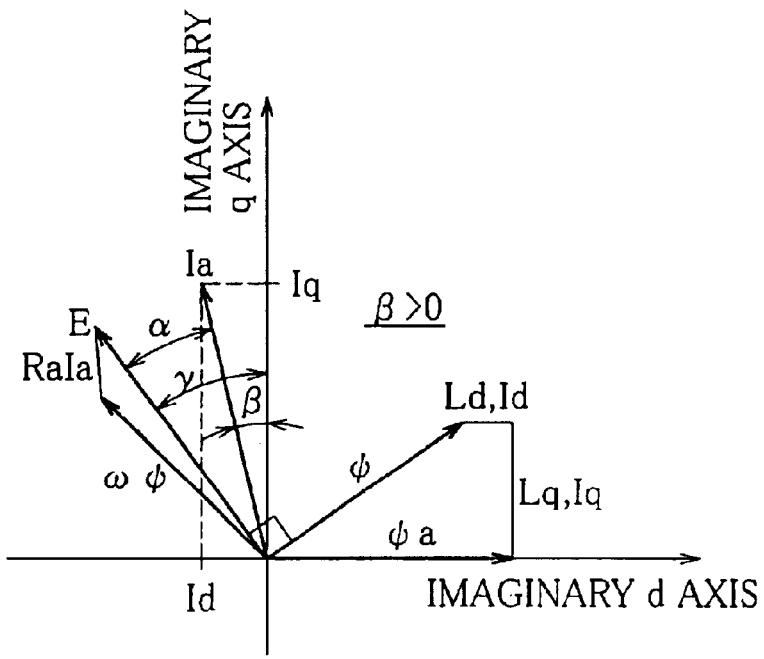
FIG. 4 is a motor vector diagram of a rotating axis system for β>0.

FIG. 4 is a motor vector diagram of a rotating axis system with magnetic flux taken as a reference position, which flux passes through an armature core. In FIG. 4, Ia denotes the motor current peak value obtained when the N pole of the armature is taken as the reference position. The d- and p-axis components Id, Iq of the motor current peak value Ia can be determined from the following formulae:

$$\begin{pmatrix} Id \\ Iq \end{pmatrix} = \sqrt{(2/3)} \begin{pmatrix} \cos\phi & \cos\{\phi-(2\pi/3)\} & \cos\{\phi+(2\pi/3)\} \\ -\sin\phi & -\sin\{\phi-(2\pi/3)\} & -\sin\{\phi+(2\pi/3)\} \end{pmatrix} \begin{pmatrix} Iu \\ Iv \\ Iw \end{pmatrix}$$

where φ represents an angle difference between the reference position of the rotating axis (the axial position of the armature core) and a reference position of a stationary axis (the U-phase coil position).

The motor current peak value Ia is represented as: Ia=√(Id²+Iq²)=I, so that the value Ia is equal to the motor current peak value I irrespective of the angle φ of coordinate axis.

Here, the angle φ is unknown since the flux of the armature core is used as the reference position. On the other hand, the relationship of Ia=I is satisfied, and the target current phase lead angle is represented as β, so that the d-axis component Id and the q-axis component Iq can be determined from the motor current peak value I and the current phase lead angle β in accordance with the following formulae:

$$Id=-I\times\sin(\beta),$$

$$Iq=I\times\cos(\beta).$$

If the d-axis inductance serving as the motor constant is Ld, q-axis inductance is Lq, motor coil resistance is Ra, magnet flux is $\Psi$, and induced voltage is $\omega\Psi$, the total armature interlinkage flux $\Psi$ and voltage E can be determined by vector calculations in accordance with the following formulae:

$$\Psi=\Psi a+LdId+LqIq,$$

$$E=\omega\Psi+RaIa.$$

Thus, the voltage phase lead angle $\gamma$ with respect to the q-axis can be calculated, and hence the phase difference a can be determined from the formula of $\alpha=\gamma-\beta$.

Meanwhile, the phase difference $\alpha$ can also be determined from the motor current peak value I and the angular velocity $\omega$ of induced voltage, instead of making the just-mentioned calculations. For instance, if the angular velocity $\alpha$ is 100 rad/sec and the motor current peak value I is 50 A, the phase difference $\alpha$ is determined to be 20 deg. In case that the just-mentioned method is adopted for the phase difference determination, the aforementioned calculation or experiment alternative to such calculation is made beforehand for various combinations of motor current peak value and angular velocity, and results of calculations or experiments are stored in advance in a memory in the form of a phase difference data table. In the phase difference determination, the desired phase angle $\alpha$, corresponding to the motor current peak value I and angular velocity $\omega$ that serve as parameters, is selected from the phase difference data table.

The voltage phase setting section 12 sets the voltage phase $\theta$ based on the current phase $\delta$ determined by the current phase/current peak value calculating section 9 and the phase difference $\alpha$ determined by the phase difference calculating section 11. Specifically, it carries out the calculation and setting of: current phase $\delta$+ phase difference $\alpha$=voltage phase $\theta$. This voltage phase $\theta$ is used in the phase voltage setting section 5 as the phase of the next applied phase voltage.

The maximum voltage value limiting section 13 monitors the motor current peak value I determined by the current phase/current peak value calculating section 9, and limits the output voltage, set by the phase voltage setting section 5, in such a manner that a voltage variation per unit time does not exceed a predetermined value (this also applies to a current variation), e.g., 10 V/sec, thereby preventing the motor vector diagram shown in FIG. 4 from being unfulfilled due to affection of a variation in current or angular velocity. Alternatively there may be a method for limiting a current value by gradually decreasing the output voltage when the motor current peak value I exceeds the maximum value of current that is permitted to flow through switching transistors in the power converting section 2, or a method for outputting an output stop command to the phase voltage setting section 5 when the motor current peak value I exceeds the just-mentioned maximum current value.

The following is an explanation (omitted hereinabove) on a command voltage determining method in the command voltage determining section 6 and a phase voltage determining method in the phase voltage determining section 5.

The command voltage determining section 6 causes the angular velocity $\omega$, determined by the angular velocity calculating section 10, to be fed back through the adder 14 to the target motor rotational speed (angular velocity of induced voltage) specified by the rotational speed command 7, and performs the processing for P control, PI control, or the like, thereby determining the command voltage (peak output value of voltage or effective voltage value). Alternatively, the command voltage may be determined in accordance with the formula of: command voltage=motor rotational speed×K (K is a proportional constant), without making the feedback of the angular velocity $\omega$, which is determined by the angular velocity calculating section 10.

The phase voltage setting section 5 determines the output voltages for the U-, V- and W-phases on the basis of the command voltage determined by the command voltage determining section 6 and the voltage phase $\theta$ set by the voltage phase setting section 12. Here, the voltage phase $\theta$ is the sum of the current phase $\delta$ determined by the current phase/current peak value calculating section 9 and the phase difference $\alpha$ determined by the phase difference calculating section 11.

If the voltage phase is $\theta$ and the peak output value ($\sqrt{2}\times$effective voltage value) of voltage is V, the respective phase voltages Vu, Vv and Vw to the motor 1, which are delayed in phase by $(\frac{2}{3})\pi$ from one another in normal operation, are represented as follows:

$$Vu=V\times\cos(\theta)$$

$$Vv=V\times\cos\{\theta-(\tfrac{2}{3})\pi\}$$

$$Vw=V\times\cos\{\theta+(\tfrac{2}{3})\pi\}.$$

If the voltage phase $\theta$ is determined, the respective phase voltages Vu, Vv and Vw can be determined since the output value V of voltage is at a predetermined value.

Figure 5:
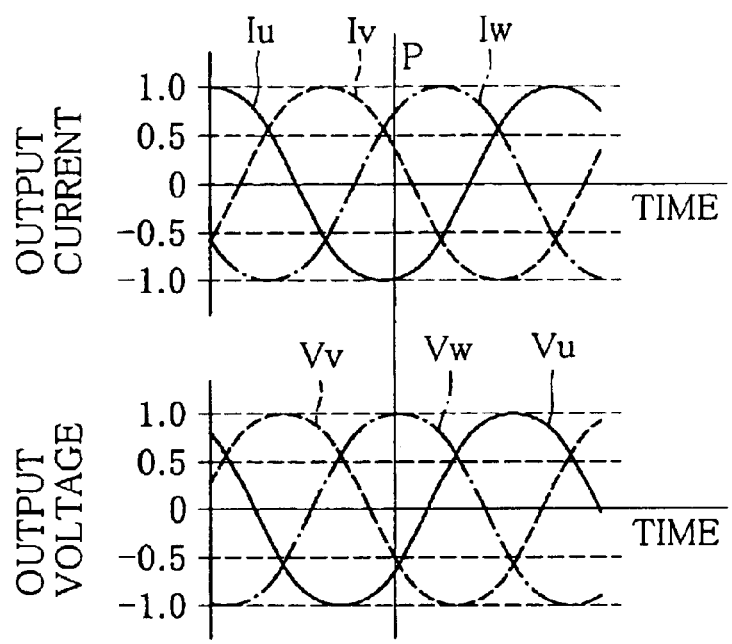
FIG. 5 is a view showing output current waveform and output voltage waveform.

With reference to FIG. 5, a concrete example will be explained. The upper part of FIG. 5 shows output current waveforms for the U-, V- and W-phases during the motor operation. If the current phase is $\delta$ and the phase difference $\alpha$ is 45 deg when the output currents Iu and Iw are detected at a given time point P, the. U-, V- and W-phase voltages Vu, Vv and Vw at that time point of P are represented as follows:

$$Vu=V\times\cos(\delta+45\text{ deg}),$$

$$Vv=V\times\cos\{\delta-(\tfrac{2}{3})\pi+45\text{ deg}\},$$

$$Vw=V\times\cos\{\delta+(\tfrac{2}{3})\pi+45\text{ deg}\}.$$

The lower part of FIG. 5 shows output voltage waveforms for the U-, V- and W-phases.

In case that the method of calculation explained based on FIG. 4 is used to determine the phase difference $\alpha$, the d- and p-axes are imaginary and the actual motor axis position is unknown, and therefore, there may be the question that the motor 1 cannot be stably operated by using the determined voltage and current phases. In this regard, a supplementary explanation will be given with reference to FIG. 6.

Figure 6:
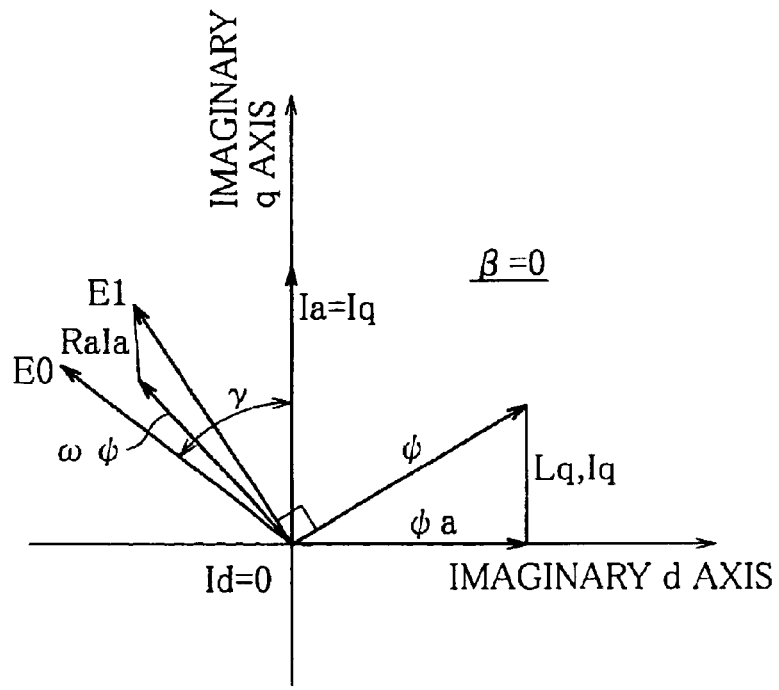
FIG. 6 is a motor vector diagram of the rotating axis system for β=0.

FIG. 6 is a motor vector diagram of the rotating axis system corresponding to FIG. 4. In FIG. 6, the current phase lead angle $\beta$ is zero, so that, in accordance with the vector calculations, the total armature interlinkage flux $\Psi$ and voltage E are determined as: $\Psi=\Psi a+LqIq$ and $E=\omega\Psi+RaIa$, and the voltage E required for ordinary operation is E1 shown in FIG. 6.

On the other hand, in the calculation method explained based on FIG. 4, it is assumed that the current phase lead angle $\beta>0$ and hence the voltage phase lead angle $\gamma$ is added, so that the voltage actually applied is represented by E0 in FIG. 6, which is deviated from the voltage E1. For this reason, the current value varies in accordance with equation of: $E0-E1=L\times(dI/dt)$ (vector value) in such a manner that its d-axis component Id increases, whereas its q-axis component Iq decreases. As a result, the current phase lead angle β approaches the state shown in FIG. 4, and due to this effect, the angular velocity ω increases when the motor rotational speed increases, so that a stable state is reached. Of course, the motor 1 continues to stably rotate, even if the voltage is applied that has the voltage phase lead angle γ being equal to the sum of the current phase lead angle β and the constant phase α.

As described above, even if the imaginary d- and p-axes are deviated, there occur changes in the current phase lead angle β, d-axis component Id, p-axis component Ip and angular velocity ω in such a manner that the motor 1 rotates with stability, and as a consequence, it is possible to stably rotate the motor 1 with the voltage E is kept at constant.

The aforementioned motor control apparatus can operate the motor 1, basically by maintaining the voltage at constant, monitoring the current/voltage phases, and maintaining a constant phase difference, without predicting the motor axis position. Thus, complicated calculations are unnecessary in controlling the drive of the motor 1, and in addition, complicated calculations are unnecessary for predicting the motor axis position. This makes it possible to stably operate the motor 1 having no sensor for detecting the motor axis position, by means of a low-priced, simple control circuit.

Although a three-phase brushless DC motor is used in the embodiment, a synchronous motor of another type can be driven by a control method similar to the one described in the embodiment, and similar functions and advantages can be achieved.

What is claimed is:

1. A motor control apparatus for driving, by means of a power converter such as inverter, a synchronous motor such as brushless motor not provided with a sensor for detecting a motor axis position, comprising:

phase current detecting means for detecting phase currents to the synchronous motor;

current phase calculating means for calculating a current phase based on the phase currents detected by said phase current detecting means;

voltage phase setting means for setting a voltage phase that is determined by adding a predetermined phase difference to the current phase calculated by said current phase calculating means;

command voltage determining means for determining a command voltage based on a rotational speed command; and phase voltage setting means for setting phase voltages to the synchronous motor based on the voltage phase set by said voltage phase setting means and the command voltage determined by said command voltage determining means.

2. The motor control apparatus according to claim 1, further comprising:

current peak value calculating means for calculating a motor current peak value based on the phase currents detected by said phase current detecting means;

angular velocity calculating means for calculating an angular velocity based on the current phase calculated by said current phase calculating means; and phase difference calculating means for calculating a target current phase lead angle based on the motor current peak value calculated by said current peak value calculating means and the angular velocity calculated by said angular velocity calculating means, and for calculating a phase difference based on the current phase lead angle, wherein said phase setting means performs a calculation in which the phase difference calculated by said phase difference calculating means is added to the current phase calculated by said current phase calculating means to thereby calculate the current phase.

3. The motor control apparatus according to claim 1, further comprising:

current peak value calculating means for calculating a motor current peak value based on the phase currents detected by said phase current detecting means;

angular velocity calculating means for calculating an angular velocity based on the current phase calculated by said current phase calculating means; and phase difference calculating means for selecting an angular velocity, using as parameters the motor current peak value calculated by said current peak value calculating means and the angular velocity calculated by said angular velocity calculating means, from a phase difference data table prepared beforehand, wherein said voltage phase setting means performs a calculation in which the phase difference calculated by said phase difference calculating means is added to the current phase calculated by said current phase calculating means to thereby calculate the voltage phase.

4. The motor control apparatus according to claim 2 or 3, wherein said command voltage determining means causes the angular velocity calculated by said angular velocity calculating means to be fed back to an angular velocity specified by the rotational speed command, to thereby calculate the command voltage.

5. The motor control apparatus according to claim 2 or 3, further comprising:

maximum voltage value limiting means for limiting an output voltage based on the motor current peak value calculated by said current peak value calculating means.

6. The motor control apparatus according to claim 4, further comprising:

maximum voltage value limiting means for limiting an output voltage based on the motor current peak value calculated by said current peak value calculating means.

* * * * *